(12) United States Patent
Kousek et al.

(10) Patent No.: US 6,421,360 B1
(45) Date of Patent: Jul. 16, 2002

(54) ROTATIONAL CONSTRUCTIONAL LASER

(75) Inventors: Heinz Kousek, Feldkirch (AT); Armin Spiegel, Berneck (CH)

(73) Assignee: Hilti Aktiengesellschaft, Schaan (LI)

( * ) Notice: Subject to any disclaimer, the term of this patent is extended or adjusted under 35 U.S.C. 154(b) by 41 days.

(21) Appl. No.: 09/696,374

(22) Filed: Oct. 25, 2000

(30) Foreign Application Priority Data

Oct. 29, 1999 (DE) .......................................... 199 52 390

(51) Int. Cl.⁷ .................................................. H01S 3/10
(52) U.S. Cl. ............................. 372/9; 372/98; 372/107; 372/108
(58) Field of Search .......................... 372/98, 107, 108, 372/92, 9

(56) References Cited

U.S. PATENT DOCUMENTS

| 4,035,084 A | 7/1977 | Ramsay |
| 5,784,155 A | 7/1998 | Ohtomo et al. |
| 5,903,345 A | 5/1999 | Butler et al. |

FOREIGN PATENT DOCUMENTS

| EP | 048806 | 6/1992 |
| EP | 0 787 972 A2 * | 6/1997 |
| EP | 0957338 | 11/1999 |

OTHER PUBLICATIONS

Patent Abstract of Japan vol. 009, No. 203 Aug. 21, 1985.

* cited by examiner

*Primary Examiner*—Leon Scott, Jr.
(74) *Attorney, Agent, or Firm*—Sidley Austin Brown & Wood, LLP

(57) ABSTRACT

A rotational constructional laser including a light source (3, 33) for emitting a laser beam (L) and located in the laser housing, a laser beam motor-driven deflection device (7; 50; 74; 104) located in a housing unit (10; 51; 73; 93; 103) secured to and at least partially projecting beyond the laser housing (2; 32, 72; 92; 102) and having a least one beam hole (52, 53) for the laser beam, a device (37) for tilting a rotational axis of the deflection device a detection device for detecting a return laser beam (R) reflected from a display mark and entering the housing unit through the at least one beam hole, an evaluation and control unit connected with the detection device and controlling operation of the tilting device, and an automatically actuatable device (40; 75; 107; 108; 109) for adjusting an axial position of the deflection device (50; 74; 104) with respect to initial axial position of the deflection device in accordance with the detection data obtained in the detection device.

17 Claims, 10 Drawing Sheets

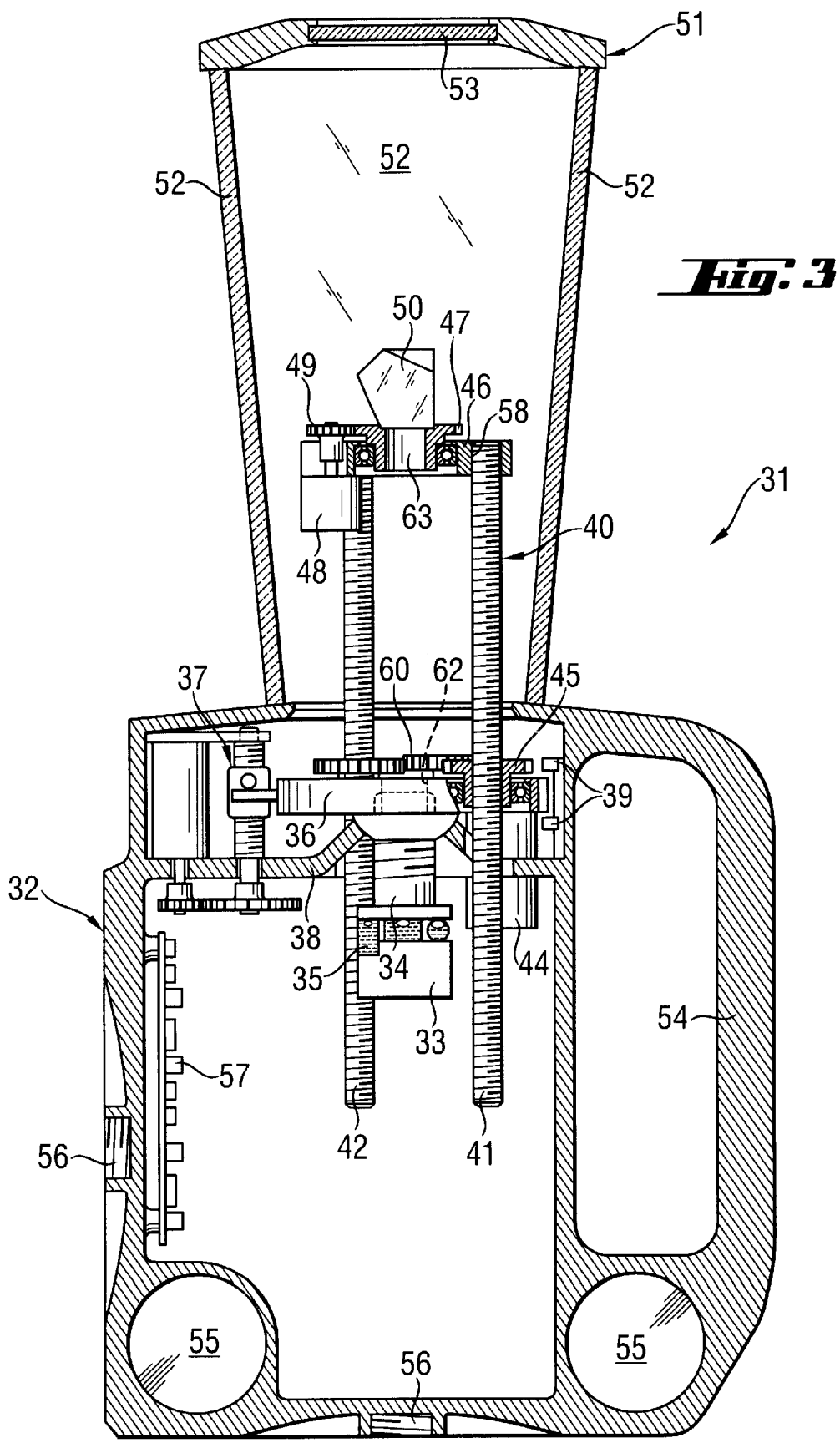

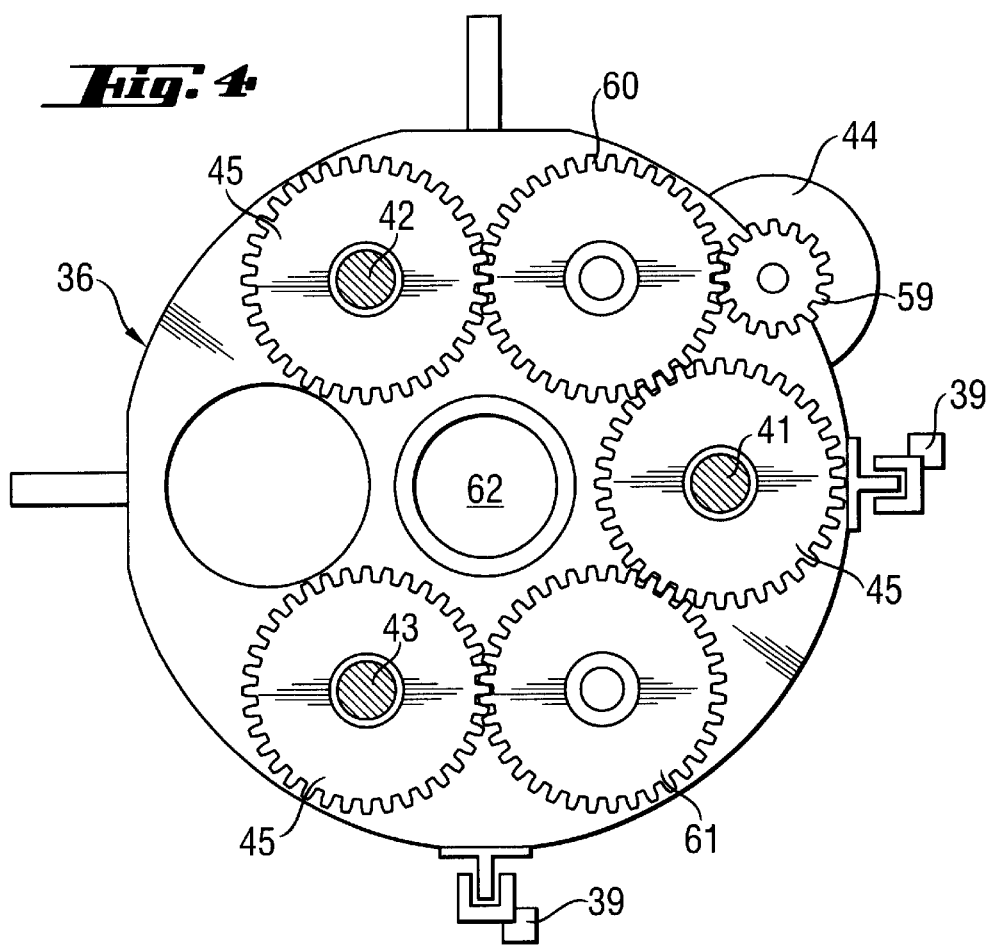
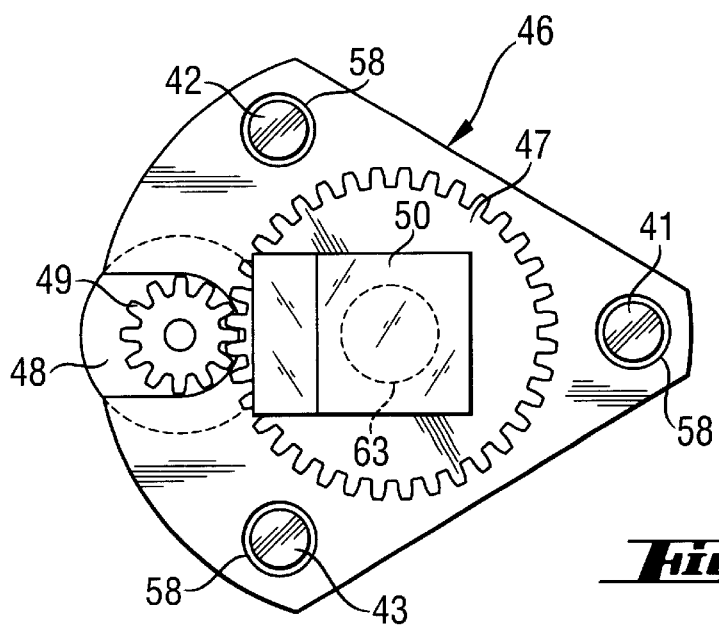

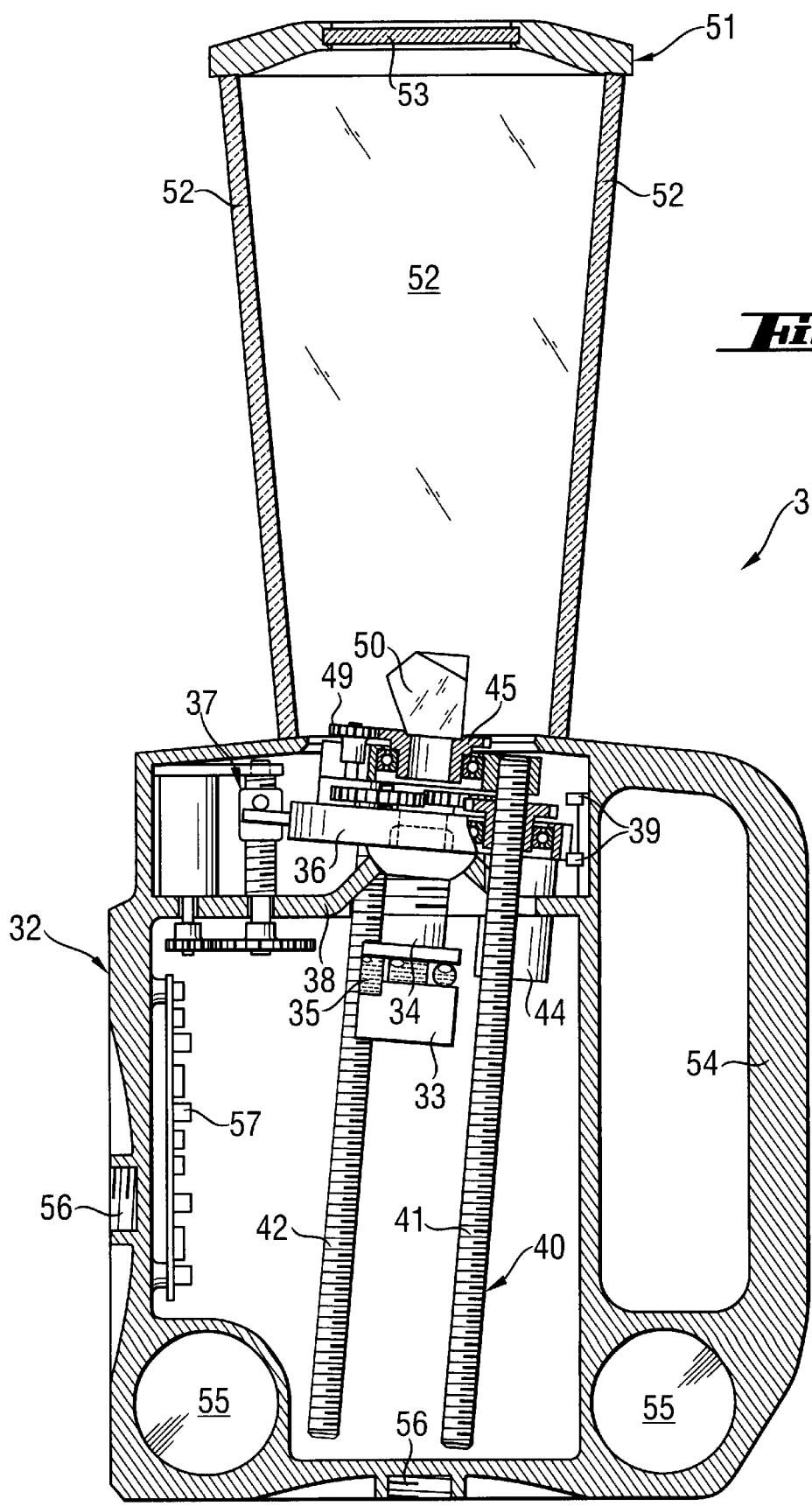

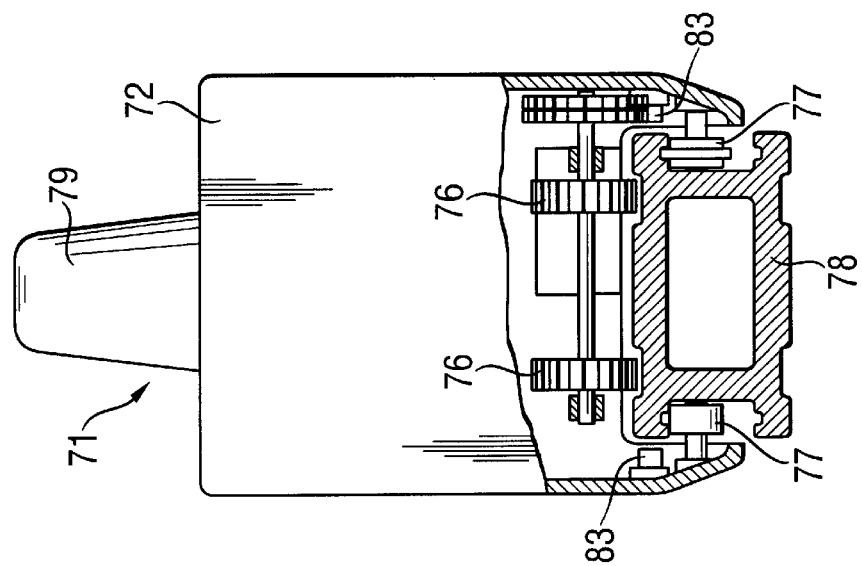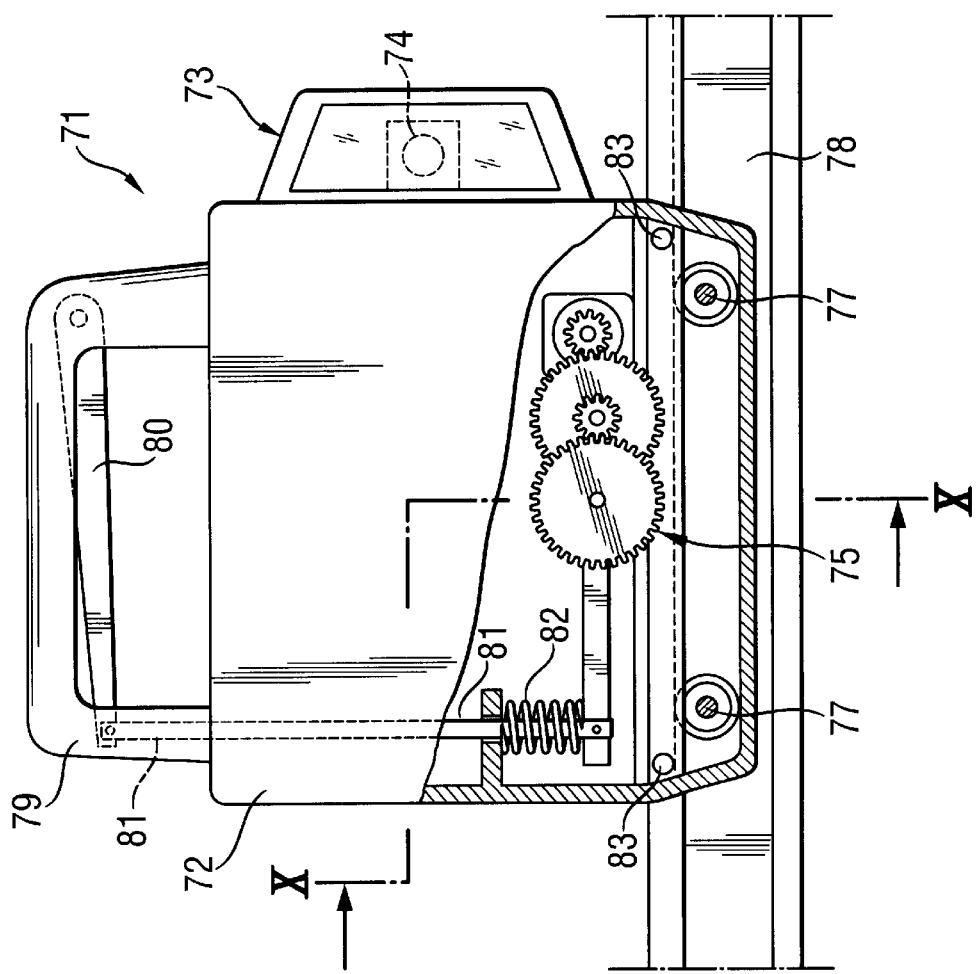

ROTATIONAL CONSTRUCTIONAL LASER

BACKGROUND OF THE INVENTION

1. Field of the Invention

The present invention relates to a rotational constructional laser including a housing, a light source for emitting a laser beam and located in the housing, a housing unit at least partially projecting beyond the housing and having a least one beam hole for the laser beam, a laser beam deflection device located in the housing unit, a drive for rotating the deflection device, a device for tilting the rotational axis of the deflection device, a detection device for detecting a return laser beam reflected from a display mark and entering the housing unit through the at least one beam hole, and an evaluation and control unit connected with the detection device and controlling operation of the tilting device in accordance with detection data obtained in the detection device.

2. Description of the Prior Art

Constructional lasers with a rotatable laser beam are primarily used in the constructional industry in installation and electrical handwork and in the associated trades as an auxiliary means for tracing horizontal and vertical lines on floors, ceilings and walls or for defining horizontal, vertical or arbitrary inclined planes in a space. They can be used, e.g., for aligning walls, door frames, windows and for determining the course of lighting installations. A conventional, prior art rotational constructional laser comprises a laser unit located in a housing and the emitted laser beam of which is deflected by about 90° by a deflection device. The deflection device rotates about an axis that coincides with the optical axis. Upon rotation of the deflection device, the laser beam, which propagates, as a result of its deflection, transverse to the rotational axis of the deflection device, describes a plane. A servo controlled device tilts the rotational axis of the laser beam in two mutually perpendicular planes in order to compensate the unevenness of the controlled surface or in order to define, if needed, inclination surfaces in a space.

Such lasers are disclosed, e.g., in European Publication EP-A-O 787 972 and EP-A-O 854 351 which describe different laser apparatuses which permit to recognize an error position of a rotational plane with respect to a reference line on a specially formed target plate. Upon occurrence of an error position, in EP-A-O 787 972, a signal is generated indicating to the user the direction in which the apparatus need be pivoted and with which the apparatus need be aligned in order to establish a correct position of a plane defined by the rotating laser beam. In EP-A-O 854 357, a servo system provides for an automatic alignment of the rotational plane of the laser beam in the direction of a reference line traced on a specially formed target plate.

As disclosed in the above-mentioned prior art publications, the conventional rotational constructional laser axis can be tilted in two directions. However, the position of the beam hole insures that the position of the plane remains stationary with respect to the laser. If, e.g., a plane, which is defined by a rotating laser beam should be displaced parallel to itself, the constructional laser itself should be displaced laterally. E.g., it may be necessary to constantly monitor the setting of a horizontal plane, which passes through a height mark on a structure, and to constantly adjust it when the position of the apparatus is unstable. In this case, usually, for height adjustment, the apparatus is mounted on a stativ, rail, or wall bracket. In case an error position is detected, the position of the apparatus is manually readjusted. If the target height mark is spaced from the laser by several meters, which can be the case when the laser is located in a center of a large space, the coincidence of the laser beam and the height mark is not always can be determined from a view point on a laser. In this case, either an auxiliary means need be used for the readjustment of the proper position of the laser, or the user has to run back and forth between the point the laser is located at and the height mark until the laser position is properly readjusted.

In another case of the use of a constructional laser, e.g., a vertical plane need be aligned in a horizontal direction of, e.g., an axis of a structure which is determined by one or two target marks provided on the structure. In this case, the constructional laser is placed on a floor or bottom of the structure and is aligned manually with respect to two marks provided on opposite walls. To this end, one mark is targeted by rotation of the laser about a vertical axis, and then the error position of a plane which is determined by the rotating laser beam, is measured with respect to the second mark. In accordance with the ratio of both deviations of the laser with respect to the two marks, the position of the laser is readjusted by displacing it by the largest distance. This process is repeated as many times as necessary until the plane, which is defined by the laser beam, passes through both marks. In the laser disclosed in the above mentioned publication, tilting of the laser rotational axis about a vertical axis can lead to an automatic alignment with respect to one of the target marks. However, this automatic alignment represents only a partial step of the entire process necessary for an exact alignment of a depictable vertical plane.

In another case of the use of a constructional laser, e.g., during renovation of old structures with generally inclined walls and/or ceilings, it can be necessary to depict a skew plane passing through three target marks provided on a structure. With a conventional laser, this is effected in a way similar to the alignment of a vertical plane with respect to the structure axis. Because there exist a third mark, more testing steps are needed, and the adjustment is effected more gradually.

The three case of the laser use, which were described above, belong to most often cases of the laser user and, with conventional lasers, their use is relatively complicated and time-consuming.

Accordingly, an object of the present invention is to provide a rotational constructional laser which would permit to conduct the readjustment processes, which were described with reference to the three cases of the laser use in a more simple manner, more rapidly, and with more comfort.

SUMMARY OF THE INVENTION

This and other objects of the present invention, which will become more apparent hereinafter, are achieved by providing a rotational constructional laser including a light source for emitting a laser beam and located in the laser housing, and a deflection device for deflecting the laser beam. The deflection device is rotated by a motor about a rotational axis of the laser. The deflection device is located in a housing unit that at least partially projects above the laser housing and has at least one laser beam hole for the laser beam. The inventive constructional laser further includes a device for tilting the rotational axis of the deflection device, and a detection device for detecting a return laser beam reflected from a display mark and entering the housing unit through the at least one beam hole. An evaluation and control unit is connected with the detection device and controls the operation of the tilting device in accordance with detection data obtained in the detection device. Still further, the laser includes an automatically actuatable device for adjusting an axial position of the deflection device with respect to its initial axial position in accordance with control signals generated by the evaluation and control unit in accordance with the detection data obtained in the detection device.

With a constructional laser according the present invention, there becomes available a further degree of freedom that simplifies the adjustment of the laser and an alignment with respect to a reference mark provided on a structure. The basic structure of the inventive constructional laser is similar to a basic structure of a conventional laser disclosed, e.g., in U.S. Pat. No. 5,784,155 and incorporated herein by reference thereto.

The present invention adds to the standard components of a conventional laser apparatus, such as sensor components, components responsible for actuation of drives, and elements for adjusting the inclination of the rotational axis, and associated therewith servo systems, an automatically actuatable device for effecting an axial displacement of the deflection device and, associated with the device, elements of the evaluation and control unit.

For adjusting the inclination of the rotational axis of the deflection device, the laser according to the present invention includes three orthogonal level sensors acting in direction of three cartesian coordinates, which are described in more detail in U.S. Pat. No. 5,784,155, in which gravitational switch serves for a rough determination of whether the laser is in a correct horizontal or vertical position. In the case when its sensitive region is sufficiently large, this task can be performed by the level sensors. An angular encoder on the deflection device serves for determining the direction in which the target plate can be seen from the laser. Thereby, the main inclination direction can be established. A detection device serves as a receiver able to recognize a reflection signal from the target plate and the plate coding. The received signal is then transmitted to the evaluation and control unit which determines the actual position of an instant rotational plane with respect to a stationary set position, which is defined by the target plate, and, in accordance with this determination, generates control signals communicated to actuators responsible for adjustment of the inclination of the rotational axis. In addition to the components described in U.S. Pat. No. 5,784,155, the present invention provides an automatically actuatable device for an axial adjustment of the position of the deflection device and modifies the evaluation and control unit so that it can recognize a necessary axial position and can generate control signal necessary for effecting the height or lateral adjustment.

The rotational constructional laser according to the present invention is designed primarily for tasks performed by a constructional worker. The worker solves the problem of depicting a plane in a space when the exit plane of the laser beam does not lie in a zero point of a coordinate system, but not from the point of view of a mathematician who performs a transformation of the coordinate. Rather, the worker procedes with an alignment of the rotational laser for depicting a plane in a space, based on certain elements which remain unchanged during the adjustment and can be realized by simple parallel displacements of the laser.

An often necessary task of the worker consists in depicting and aligning of a vertical plane. In this case, the direction is determined by displacement that should be effected parallel to or transverse to the axis of a structure. The direction of the axis is usually taken at the structure contour and is shifted by a certain amount parallel to the contour and is determined form the project. Parallel shifting is always effected by taking the normal distance to a building line at two point spaced by a largest possible distance, when possible, at two contours running transverse to the axis. These points generally lie in a diametrical direction to an installation location of the laser. In this case, the installation location of the laser is so selected that the beam hits both marks. The vertical direction is predetermined and/or retained by the laser, so that the laser is not directly arranged in the connection line of the two marks but need only be arranged in a vertical plane passing through this connection line. When the laser according to the present invention is located in a vertical plane, it can register two target marks which can be seen, within predetermined tolerances, with respect to a horizontal and in an opposite direction from the laser. The alignment of the laser is effected by an automatic actuation of the adjusting drives responsible for the adjustment of the inclination of the rotational axis and for the axial height positioning of the laser beam deflection device in accordance with the amount of the laser light reflected form the target marks. The erroneous position is determined by the detected ratio of differently polarized light components of the laser light reflected from different regions of the target marks. If the deviations of both target marks have the same sign, then the axial height adjustment is actuated. As soon as the sign of the deviation of one of the target marks changes or alternates, simultaneously or alternatively the adjustment drives for the adjustment of the inclination of the rotational axis and for the axial displacement of the deflection device are actuated. Thereby, it is insured that one of the target marks would not disappear from the registered region as a result of too early initiation of the inclination of the rotational axis.

A most common task is depicting of a horizontal plane passing through a height mark provided on a structure. Two, different form each other, nonparallel directions in a plane are set based on the horizontality. The third set point is determined by the height mark. At that, the location of the laser on the floor of a structure is so selected that a most possible shade-free scanning of the work area is obtained. The height is manually adjusted by mounting the laser on a telescopic stativ or a wall bracket with a rail guide. The laser retains at that its horizontal alignment, or the horizontal alignment is adjusted automatically. When the laser location need be changed, the height is established again according to the already marked point with respect to the previous location. A so-called shock cut-off takes place in response to rapid excursion of the laser apparatus within a certain tolerance. Thereby, a further error operation, which take place when the laser or stativ is subjected to some inadvertent shocks, is prevented. Slow sinking of the laser apparatus, which take place, e.g., when the stativ is poorly secured, and which could not be recognized and compensated when the conventional lasers were used, can be counteracted when the laser according to the present invention is used. The counteraction is based on the axial height adjustability of the laser beam deflection device. The height mark, with respect to which the laser beam is aligned, remains stationary on the structure during the works in predetermined work field. The position of the laser is controlled by the reflected from the mark, laser beam and is automatically adjusted to an exact height. The adjusted height is retained even if the stativ height, at which the laser is secured, is inadvertently changes. When the stativ is located within the visual region of the height mark, the height of the deflection device of the laser is again automatically adjusted according to the identical reference mark.

A less often case of the use of the rotational constructional laser according to the present invention is depicting of a skew plane through three points defined by target marks on a structure. This case, e.g., can be encountered in all structures. In this case, a plane should represent a "best fit" in the given structures, e.g., a vault, a cavern, a room with an inclined window band, a roof attic, etc. Often, the system is even overdetermined, i.e., the adaptation represents a visual plane over more than three points. While when a conventional laser is used, the solution is only iterative, i.e., is found by a trial and error method, the present invention facilitate the representation of the desired plane. To this end, alternatively, an axial displacement of the rotational axis and an adjustment of the inclination of the rotational axis are effected until the rotating laser beam passes all of the three target marks at the set positions. If two target marks spaced relative to each other by 180°, have the same sign of the deviation from the set position, an axial adjustment takes place. Simultaneously or intermittently, an adjustment of the inclination of the rotational axis according to the third target mark also takes place. In this way, a disappearance of the third target mark from the scanned region is prevented. As soon as the sign of the deviation of one of the target marks of the set position changes, simultaneously or intermittently, the inclination of the rotational axis in the second direction is readjusted, and a corresponding axial displacement takes place. When both target marks, which are spaced by 180° relative to each other, have opposite signs of the deviations, the adjustment of the rotational axis is effected until the sign of one of the deviation changes. In case the third target mark lies closer to that of the two target marks which has an opposite sign of the deviation, this error position is taken into account during the adjustment of the inclination of the rotational axis. Otherwise, this error position remains unnoticed. As soon as the error position with respect to one of the two first-mentioned target marks changes it sign, the adjustment drives responsible for the axial displacement and for inclination in the second direction are readjusted.

Further cases of the use of the invention rotational constructional laser include the following adjustment.

When a target mark for a horizontal alignment of the laser is identified and the error position with respect to this mark is established, the automatic device for axially displacing the laser beam deflection device is actuated. If at the beginning of the axial displacement step, one or two level systems for controlling the inclination of the rotational axis were equalized, i.e., adapted to each other, a respective level system remains active. In this way, a possible leveling error is automatically corrected during and after the axial adjustment.

At the detection of an error position of displayed plane extending transverse with respect to a target marking, the direction of the error position is detected, and the rotational axis is inclined or tilted to such an extent that the direction shows the maximum inclination to this target marking.

When an error position of a horizontally arranged target mark and a vertically arranged target mark are established, the axial displacement and the adjustment of the rotational axis inclination are effected in such a way that the main inclination direction is perpendicular to the direction toward the horizontal target mark. The initial position of the horizontal plane is reliably maintained due to laser beam deflection device remaining at the same height as the horizontal target mark. The initial position of the vertical plane and the basic alignment of the laser are insured when the horizontal target mark is located, within predetermined tolerances, above and below the laser and the associated plane is aligned, by a plumb and the horizontal target mark, in the direction of the vertical target mark.

When at a non-vertical position of the inventive rotational constructional laser, two vertical target marks are scanned, the adjustment drive at least of the inclination adjustment of the rotational axis of the shaft, which is connected with the laser beam deflection device, is actuated until both target marks are located in the set positions. The axial position remains unchanged. In this way a plane is depicted that is skewed, passing through the given position of the laser beam deflection device and both target marks.

The adjustment process is conducted in a timely sequence in such a way that the laser scans the existing target marks with little rotation. When only one target mark or two target marks, aligned with respect to each other at an angle under 90°, is (are) available, the rotation of the shaft of the laser housing is controlled, preferably, in such a manner that the laser scans only this limited region. In another case, the laser beam performs a complete revolution. Only after the equalization takes place, the laser reacts on a scanning target, in case it is arranged in the beam path. As soon as the scanning target does not obstruct the beam path, the beam again performs a complete revolution. If the beam finds that the original positions of the target marks do not coincide with the equalizing positions, the laser turns to the adjustment mode and perform the equalization or tuning anew.

In accordance with a first embodiment of the present invention, the axial position adjusting device includes a mechanically vertically adjustable stativ the adjustment drive of which is actuated in response to the control signals generated by the evaluation and control unit.

In this embodiment of the invertile laser, the evaluation and control unit is modified to an extent that it is capable of generating control signals, which are communicated to the adjustment drive responsible for the axial displacement, upon detection of error position(s) of one or more target marks.

The connection of the laser with the adjustment drive for the height adjustment of the stativ can be effected in a simple manner by using a connection cable. In the advantageous embodiment of the present invention the stativ has a mounting plate provided with connection contacts. Upon mounting of the laser on the mounting plate the mounting plate contacts are connected with corresponding contacts provided on the laser housing for communicating the control signals, which are generated by the evaluation and control device, to the stativ displacing drive. The contacts provided on the laser housing can also serve, if necessary, for connecting the adjustment drive with the power source.

With this embodiment, a loosely suspended cable and other like elements are eliminated, and a separate power source for stativ drive can be dispensed with. The adjustment drive is supplied with the power from the laser power source. The range of the axial adjustment or of the height adjustment, which can be obtained by using the stativ, amounts to, e.g., from −50 cm to +50 cm.

In accordance with an alternative embodiment of the laser according to the present invention, the adjusting device includes a rail on which the housing is supported in such a manner that the rotational axis of the deflection device extends parallel to the rail. Upon detection of an error position, housing is displaced along the rail in accordance with control signal generated by the evaluation and control unit.

The constructional laser according to the present invention can be mounted on a mounting plate displaceable along the rail. In a preferred embodiment of the present invention, the laser housing is equipped with support rollers and mechanically driven drive rollers which are actuated in response to control signal generated by the evaluation and the control unit. The support and drive rollers facilitate the displacement of the laser itself along the rail which is effected in accordance with the signals generated by the evaluation and control unit. The drive is effected with one or more friction rollers or by using rollers provided with outer toothing and supported on the rail. The axial displacement along the rail is determined by the length of the rail and can be effected within a range of about ±50 cm.

In accordance with a further embodiment of the present invention, the automatically actuatable device for axially adjusting the position of the laser beam deflection device is integrated in the laser housing. To this end, the deflection device is mounted on a rotatable platform that is axially adjusted in accordance with the value of a control signal generated by the evaluation and control unit. With this embodiment of the inventive rotational constructional laser, no special additional elements such as, e.g., a rail or a mechanically adjustable stativ, are necessary. Complementary components, which are necessary for effecting the axial adjustment are likewise integrated in the laser housing. The axial adjustment range of the deflection device, in this embodiment of the inventive laser, amounts to +65 mm from the initial position of the deflection device.

The platform with the laser beam deflection device is located in a housing unit projecting above the laser housing. The housing unit itself can be rotated. In this case, a single laser beam hole is aligned with the non-deflectable laser beam. In the preferred embodiment, the platform is height-adjusted within the housing unit. The housing unit has a shape of a lantern and is fixedly connected with the housing. The embodiment is very robust because the rotatable shaft inside the lantern is protected against jolts.

In order to be able to rotate the laser beam without any obstacles, the lantern-shaped housing unit is provided with four laser beam windows extending substantially in the axial direction. In order for the deflected laser beam to be able to exit the lantern-shaped housing unit over its entire axial displacement path, the windows have a height larger than the entire possible displaceable path. Advantageously, the window height amounts to from about 150 mm to about 160 mm. With such a window height, the adjustment path of +65 mm from a center position can be realized without any hindrance.

In order to provide for a plumb beam, which runs transverse to the deflected laser beam, advantageously the lantern-shaped housing unit has a further laser beam hole arranged substantially transverse to the rotational axis of the rotatable shaft. In this case, the deflection device is formed as a beam splitter to provide for a plumb component of the laser beam.

For the sake of stability, the platform for the deflection device is supported at three points. At least one of the support points is formed by an axially extending threaded spindle that cooperates with the adjusting motor. The threaded spindle provides for a precise axial adjustment. The rigidity of the system is increased and an inadvertent tilting of the deflection device-carrying platform can be prevented when all of the three support points are formed by axially extending threaded spindles which are synchronously displaced by the adjusting motor in accordance with a control signal generated by the evaluation and control unit.

An input keyboard, which is provided on the laser housing, permits to adapt the operation of the evaluation and control unit to specific requirements, e.g., the keyboard permits to change the priority of the inclination adjustment and the axial adjustment. The keyboard can also be used for turning off, if needed, a particular adjustment mode(s).

In accordance with still further embodiment of a rotational constructional laser according to the present invention, a second light source is arranged within the laser housing. There is further provided a second deflection device for deflecting a light beam emitted by a second light source. The second deflection device is located in a second housing unit likewise projecting beyond the laser housing and having at least one beam hole spaced by 90° with respect to the at least one beam hole in the first housing unit.

The laser in accordance with this embodiment is capable of depicting, if needed, simultaneously two planes in a space. In a particular preferred embodiment of such double head rotational constructional laser, the position of the second deflection device is likewise automatically axially adjustable along its rotational axis. The adjusting components for the axial adjustment of the second deflection device correspond to the like components for the axial adjustment of the first deflection device.

When the laser beam deflection device is formed as a pentaprism, small deviations of the rotational axis of the pentaprism with respect to the optical axis are easily compensated. This simplifies the adjustment during the assembly of the laser and permits to compensate some shifting of the components that can take place as a result of jolts to which the housing may be subjected. The pentaprism can be formed, if needed as a beam splitter in order to provide unhindered passing of a portion of the laser beam while the second portion of the laser beam is deflected by 90°.

In accordance with a further advantageous embodiment of the present invention, the device for axially adjusting the position of the deflection device is equipped with end sensors. When the apparatus reaches the limit of the adjustment region, an optional and/or acoustic alarm signal is emitted. The alarm signal is also emitted when the rotational axis passes beyond the limits of the adjustable inclination angle. The laser preferably is equipped with devices, e.g.; optical or acoustic alarm means that indicate to the user of the laser that a number of target marks or a combination of target marks, which leads to redundancy and, therefore, to contradictory results, has been detected.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3 a cross-sectional view of a first embodiment of a rotational constructional laser according to the present invention;

FIG. 4 a plan view of a positioning device for a laser beam deflecting device;

FIG. 5 a plan view of a laser beam deflecting device;

FIG. 8 a cross-sectional view of the rotational constructional laser shown in FIG. 3 in a further selected position of the deflecting device;

FIG. 9 a side view of a second embodiment of a rotational constructional laser according to the present invention;

FIG. 10 a cross-sectional view of the laser shown in FIG. 9 along cross-sectional line X;

FIG. 13 a schematic view illustrating one example of use of a rotational constructional laser according to the present invention; and.

DETAILED DESCRIPTION OF THE PREFERRED EMBODIMENTS

Figure 1:
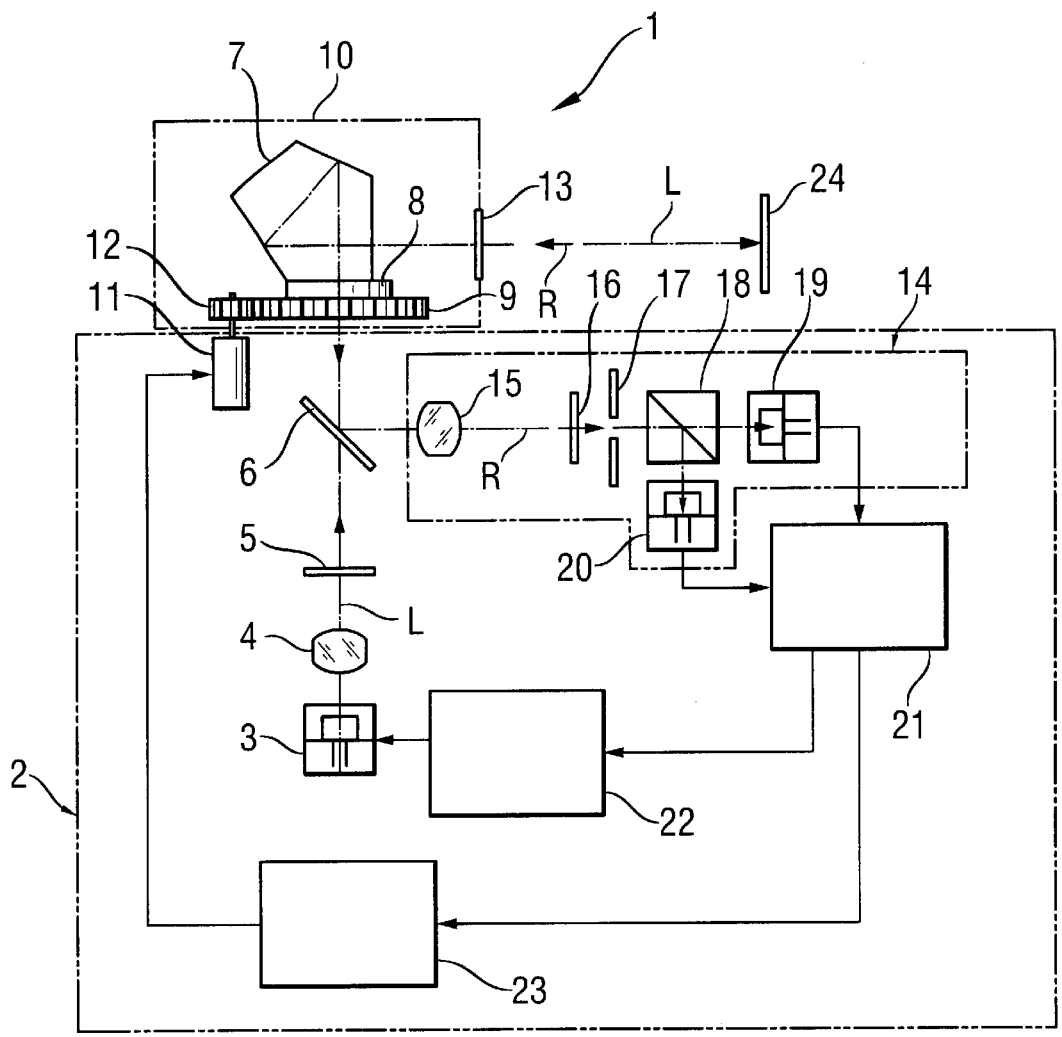
FIG. 1 a block-diagram of a prior art constructional laser.
Figure 2:
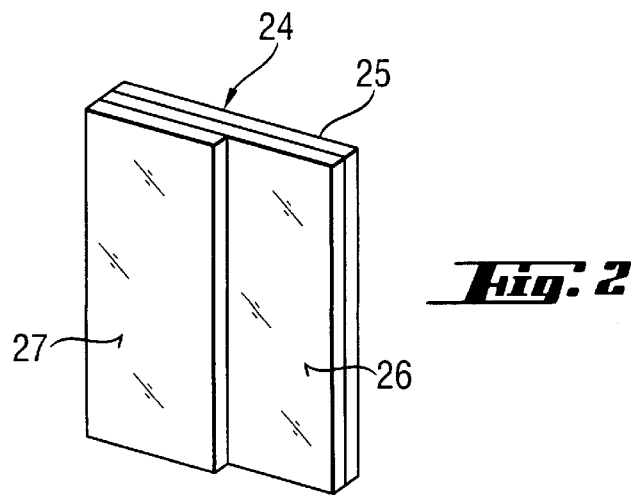
FIG. 2 a view of a target mark for use with a constructional laser shown in FIG. 1.

A prior act constructional laser, a block-diagram of which is shown in FIG. 1, is generally designated with a reference numeral 1. Such a laser is disclosed, e.g., in European Publication EP-A-0854351. The notational constructional laser 1 includes a housing 2, which is shown in FIG. 1 with dash lines, and a light source 3 for producing a laser light beam L and which is located inside the housing 2, which is shown in FIG. 1 with dash lines, and a light source 3 for producing a laser light beam L and which is located inside the housing 2. As a light source, in particular, a laser diode can be used. The linear polarized laser beam L, which is emitted by the laser diode 3, passes through a collimator lens system 4 before it reaches a $\lambda/4$ wafer 5 in a form of parallel rays. When the laser beam L passes the $\lambda/4$ wafer 5, the linearly polarized laser beam L is circularly polarized. The circularly polarized laser beam L, upon passing through the $\lambda/4$ wafer 5, passes through a semipermeable mirror 16, which lies in the optical axis, and finally reaches the deflection device 7 which is preferably formed as a pentaprism. The pentaprism or deflection device 7 is mounted on a platform 8 connected with crown gear 9. The crown gear 9 cooperates with a drive pinion 12 supported on an output shaft 12 of an electric motor 11. The electric motor 11 provides for rotation of the pentaprism 7 about the optical axis. The pentaprism 7 is located in a housing unit 10 that extends beyond the apparatus housing 2 and has at least one light beam hole 13 for the laser beam L when the later is deflected by the pentaprism 7 by about 90°. In case when there is only one beam hole 13, the housing unit 10 is rotated together with the pentaprism 7 so that the laser beam L can describe a plane. The circularly polarized light beam L falls on a target mark 24 shown in eletail in FIG. 2. The target mark 24 is plate-shaped and has a support substrate one surface of which is provided with a reflecting layer 26. A portion of the flat surface provided with the reflecting layer 26 has a further layer 27 formed similar to the 14 wafer. The circularly polarized light beam L, which falls on the target mark 24, is reflected from the reflecting layer 26 unchanged. When the circularly polarized light beam L falls on the $\lambda/4$ layer 27, it is phase-shifted by $\lambda/4$. After being reflected by the reflecting layer 26, the reflected laser beam R passes the $\lambda/4$ layer 27 a second time. As a result, a total phase shaft of the laser beam in comparison with the initial laser beam L is $\lambda/4$. The circular polorization of the laser beam remains unchanged.

The reflected laser beam R enters the housing unit 10 again through light beam hole 13 of the housing unit 10. The pentaprism 7 deflects the laser beam R toward the semipermeable mirror 6 which deflects the return laser beam R toward a detection device 14. At the entrance of the detection device 14, there is provided a condenser lens system 15 that focuses the reflected laser beam R on the following sensors, in particular, photodiodes. Downstream of the condenser lens system 15, there is located another $\lambda/4$ wafer 16. Upon passing $\lambda/4$ wafer 16, the circularly polarized laser beam R becomes again linearly polarized. Dependent on whether the reflected laser bean was reflected only from the reflecting layer 26 or was additionally reflected by the $\lambda/4$ layer 27 of the target mark 24, the polarization direction of the linearly polarized reflection laser beam R differs by 90° in accordance with the phase difference. The reflected laser beam R reaches a beam splitter 18 which, dependent on the polarization direction of the laser beam R, either insures its passing to the first photodiode 19 or deflects it toward the second photodiode 20. An aperture 17, which is provided in front of the beam splitter 18, either masks or does not mask the spill light of the light incoming along the optical axis.

The photodiodes 19,20 are connected with an evaluation and control unit 21 which processes the signals outputed by the photodiodes 19,20. In accordance with the value of the defected light quantity, the evaluation and control unit 21 generates control signals which are communicated to a tilting device 22 for tilting the optical axis of the system defined by a line extending between the laser light source 3 and the deflection device 7 in two mutually perpendicular planes. The tilting of the axis is needed to correct errors detected by the detection device 14. The control signals, which are generated by the evaluation and control unit 21, can also be communicated to regulating device 23 for the electric motor 11, e.g., in order to place the laser light beam L in a predetermined position at the point of rotation. The electronics of the evaluation and control device 21 is designated with a reference numeral 57 and usually is connected with a keyboard, not shown in detail, which is provided on the outer side of the apparatus housing 32 (see FIG. 32).

FIG. 3 shows a first embodiment of a rotational constructional laser according to the present invention which is generally designated with a reference numeral 31. For the sake of clarity, the view is limited only to the components necessary for the understanding of the present invention. The laser apparatus 31 has a housing 32 which is formed integrally with a handle 54. In the bottom of the housing 32, there are provided pockets 55 for batteries or accumulators. On the bottom of the housing 32 and on the side of the housing 32 opposite the handle 54, there are provided threaded terminal ends 56 for mounting the laser 31 on a stativ. Inside of the housing 32, there is located a laser light source 33 the laser light beam of which is directed toward a deflection device 50, e.g., a pentaprism, via an optical unit 34 arranged in the optical axis and including, e.g., a collimator and a $\lambda/4$ wafer. The deflection device or pentaprism 50 is located inside of lantern-shaped housing unit 51 which extends beyond the housing 32. The housing unit 51 is fixedly connected with the housing 32 and has four windows 52 inclined outwardly with respect to the optical axis. A light beam opening 53 is formed at the extension of the optical axis. The light beam opening 53 is, e.g., provided for a plumb beam which is separated in the pentaprism 50 from a deflected laser beam. The pentaprism 50 supported on the crown gear 47 and rotates therewith.

The optical unit 34 and the laser light source 33, which are located inside of the housing 32, and connected with an inclination plate 36 tiltable by a tiling device in two mutually perpendicular planes. Only an inclination device 37 of the tilting device is shown in FIG. 3. The inclination device 37 is mounted on a base plate 38 fixedly secured in the housing 32. The tilt or inclination of the inclination plate 36, and of the optical unit 34 and the laser light source 33, which are connected with the inclination plate 36 is monitored by a sensor block 35 which, e.g., can be connected with the laser light source 33. End switches 39 serve for the determination of extreme tilt positions and for stopping the tilting device. The inclination device 37 of the tilting device does not form part of the present invention. This device is known from the prior art and are contained, e.g., in rotational constructional lasers produced by the assignee of the present invention. The structure and functioning of such inclination devices is well known and, therefore, need not be described here.

According to the present invention, the rotational construction laser 31 is provided with an automatically actuated adjusting device 40 for adjusting a position of the pentaprism 50 along the optical axis. To this end the pentaprism-supporting platform 46 is supported on three treaded sprindles 41, 42, 43 which cooperate with screw sockets 45 provided on the inclination plate 36. The screw sockets 45, which have each an inner thread and an outer toothing, are rotated by an adjusting motor 44 whereby respective threaded spindles are axial by adjusted.

In the plan view shown in FIG. 4, the threaded spindles 41, 42, 43 are shown in cross-section. The threaded spindles 41, 42, 43 are displaced through central threaded bores of respective screw sockets 45. The three threaded spindles 45 are synchronously adjusted by the adjusting motor 44. To this end, intermediate gears 60,61 are provided between respective screw sockets 45. The screw sockets 45 are rotated by a driven pinion 59 mounted on the output shaft of the adjusting motor 44. The screw sockets 45 are so engaged with the intermediate gears 60,61 that equal thread lengths are provided between the platform 46 and the inclination plate 36. Thereby, a positive adjustment takes place. As can be seen in FIG. 4, the inclination plate 36 has an axial bore the diameter of which is so selected that the laser beam can pass therethrough without any edge diffraction phenomena.

FIG. 5 shows a plan view of the pentaprism-carrying or supporting platform 16. The threaded spindles 41, 42, 43 are fixedly screwed in the platform 46 at the screw positions 58. The adjustment of the axial position of the platform 46 is effected by the rotation of the screw socket 45 which leads to the axial displacement of the platform-supporting spindles 41, 42, 43. The rotation of the pentaprism 50 about the optical axis is effected by actuation of the drive motor 48 the output shaft of which causes the rotation of the crown gear 47 carried by the platform 46.

Figure 6:
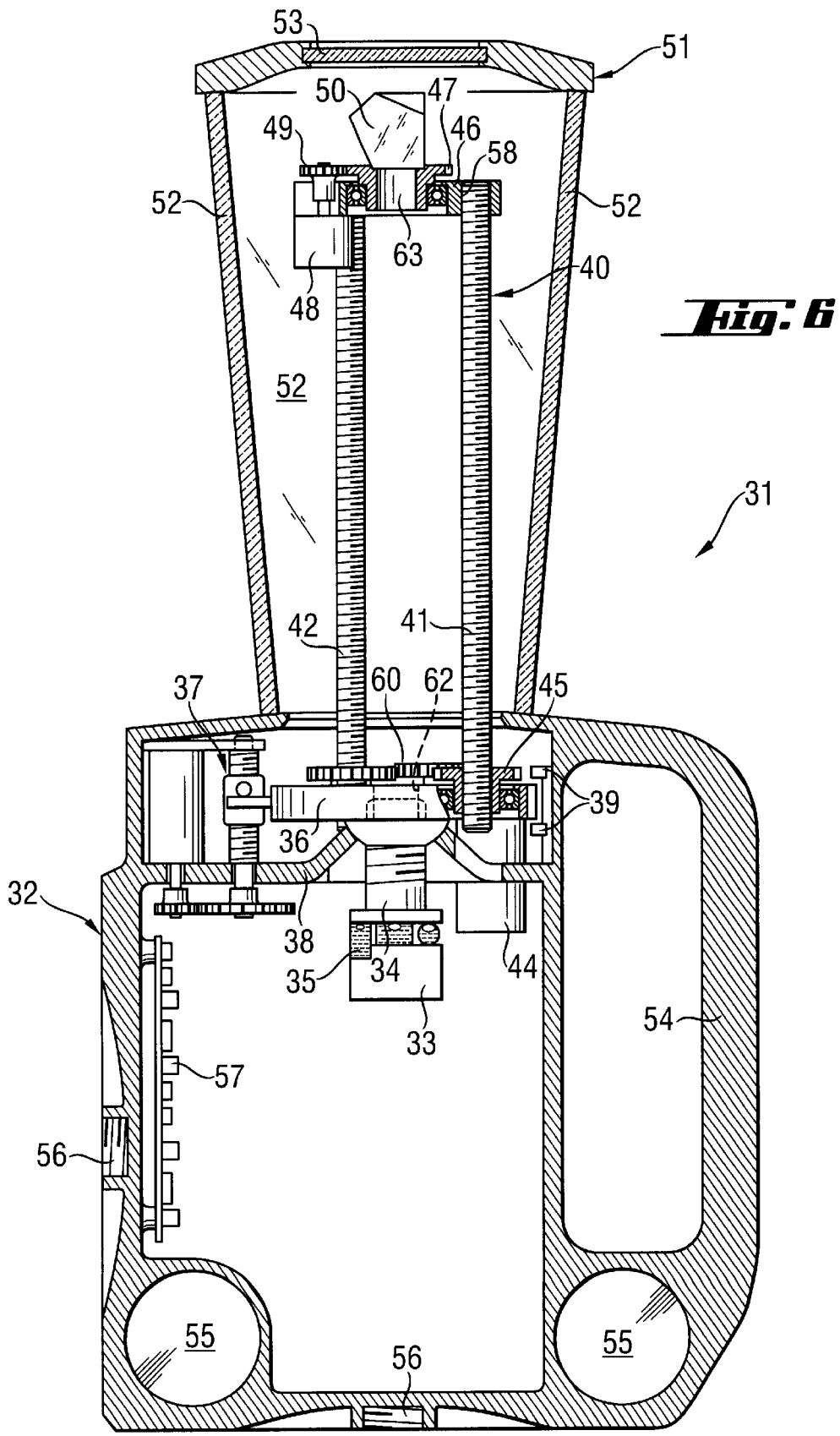
FIG. 6 a cross-sectional view of the rotational constructional laser shown in FIG. 3 in one selected position of the deflecting device.

While in FIG. 3, the pentaprism 50 is shown in a position in which it is located approximately in the middle of its possible axial displacement path, FIG. 6 shows the pentaprism 50 and the adjusting device 40 in a position in which the pentaprism 50 is located at a maximum possible axial distance from the housing 32. This position is determined by the length of the threaded spindles 41, 42, 43 and by the height of the side windows 52 of the housing unit 51. Preferably, the height of the side windows 52 amounts to from about 150mm to about 160 mm. With this height of the side windows 52, a sufficiently large adjustment path of the pentaprism 50, in both directions from its middle position, is obtained. In the embodiment shown in FIGS. 3–6, the adjustment path of the pentaprism 50 in each of the opposite directions amounts to about 65 mm.

Figure 7:
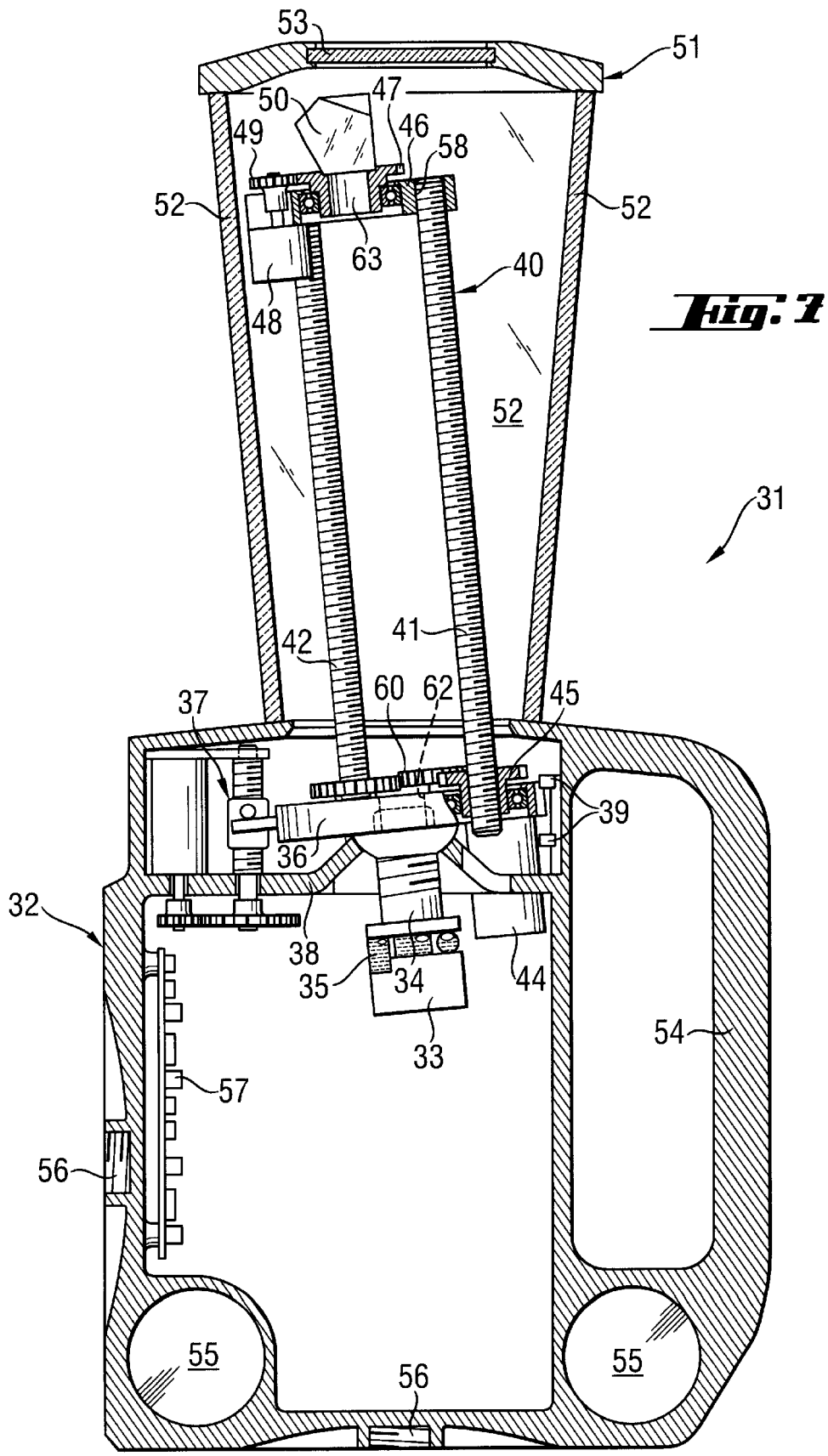
FIG. 7 a cross-sectional view of the rotational constructional laser shown in FIG. 3 in another selected position of the deflecting device.

FIGS. 7–8 show the pentaprism 50 in both its extreme positions. In addition, FIGS. 7–8 show the maximum possible inclination of the tilting plate in its tilt plane. As shown in FIGS. 7–8, the inclination of the side windows 52 of the housing unit 51 is so selected that in both axial extreme positions of the pentaprism 50, no component of the window 52 and the housing 32 interferes with the laser functioning. In the embodiment of the rotational constructional laser according to the present invention which is shown in FIGS. 3–8, the lantern-shaped housing unit 51 is fixedly secured to the apparatus housing 32 and remains, therefore, stationary. However, it is within the scope of the present invention to have a housing unit rotatable together with the pentaprism. In this case, no large-surface side windows are needed. It is sufficient to provide a slot-shaped opening extending over the height of the housing unit and coinciding with the beam path.

A rotational constructional laser, which is shown in FIGS. 9–10 is generally designated with a reference numeral 71. The laser 71 is shown in FIGS. 9–10 in its horizontal position which is necessary for handling vertical planes. The basic construction of the laser 71 substantially corresponds to the construction of conventional lasers. In the position shown in FIGS. 9–10, the pentaprism containing housing unit 72 lies sidewise of the apparatus housing 72. The difference between the laser 71 shown in FIGS. 9–10 and the conventional lasers consists in the structure of the adjusting device 75 for adjusting the position of the pentaprism 74. In the shown embodiment, the adjusting device 75 includes automatically motor-driven drive rollers 76 and a rail 78 extending along the optical axis. The axial adjustment is effected by the displacement of the rollers 76 integrated in the apparatus housing 72. The drive rollers 76 can be formed as friction rollers or be provided with external toothing. The running rollers 77, which are displaced together with drive rollers 76, circumscribe a portion of the rail 76 and provide for a sufficiently large press-on force. The press-on force is produced by spring 82. The compression and release of the spring 82 is effected with a release lever 80 which is integrated in the handle 79 of the housing 72 and which acts on the spring 82 via rod 81. The handle 79 serves for connecting and disconnecting the laser 71 with the rail 78. The release lever 80 is so integrated in the handle 79 that it can be actuated only when an operator grasps the handle 79. This insures a single-hand operation of the laser 71, and an unintended release or stoppage does not lead to an immediate disconnection of the laser 71 form the rail 78. End sensors 83 are provided at opposite ends of the rail 78 to prevent displacement of the laser past the ends of the rail 78. The drive for effecting the adjustment of the axial position of the laser 71 is preferably self-locking so that the laser 71 can operate with a vertically extending rail. The rail 78 can have support stands or be formed as a part of a wall-mounted device.

Figure 11:
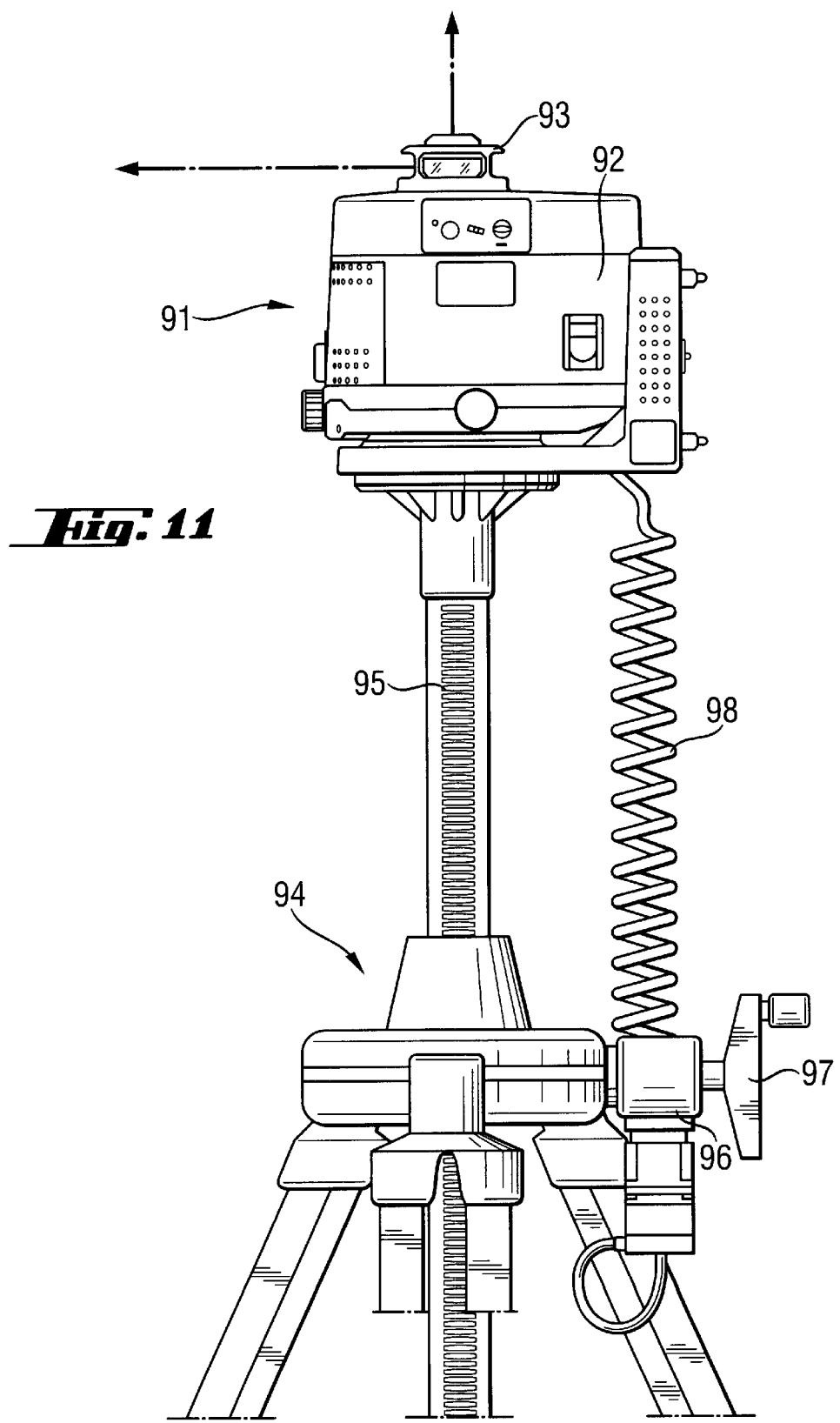
FIG. 11 an elevational view of a third embodiment of a rotational constructional laser according to the present invention.

A rotational constructional laser according to the present invention, which is shown in FIG. 11, is generally designated with a reference numeral 91. The laser 91 differs from the above-described lasers 1 and 71 in that the means for the adjustment of the axial position of the pentaprism is provided outside of the apparatus housing 92. In the embodiment of the inventive laser shown in FIG. 11, the laser 91 and a stativ 94, which is designed for effecting an axial adjustment of the pentaprism which is located in the housing unit 93, form a unitary assembly. For effecting the adjustment of the axial position of the pentaprism, the stativ 94 is provided with a drive unit 96 for adjusting the height of the rod 95. The connection of the laser 91 with the drive unit 96 for transmission of the control signals from an evaluation and control unit, which is arranged in the laser housing 92, is effected with plug-in connection means. In the embodiment shown in FIG. 11, a connection cable 98 is used. The drive unit 96, which includes a motor and a gear unit, is associated with a crank drive 97 for the stativ 94. A mechanical frictional connection with the rod 95 is effected with a friction clutch. This provides for a rough adjustment which is effected, as in conventional lasers, manually. The modular concept, which is realized in the embodiment of the inventive laser shown in FIG. 11, permits to effect both rough and fine adjustments.

Figure 12:
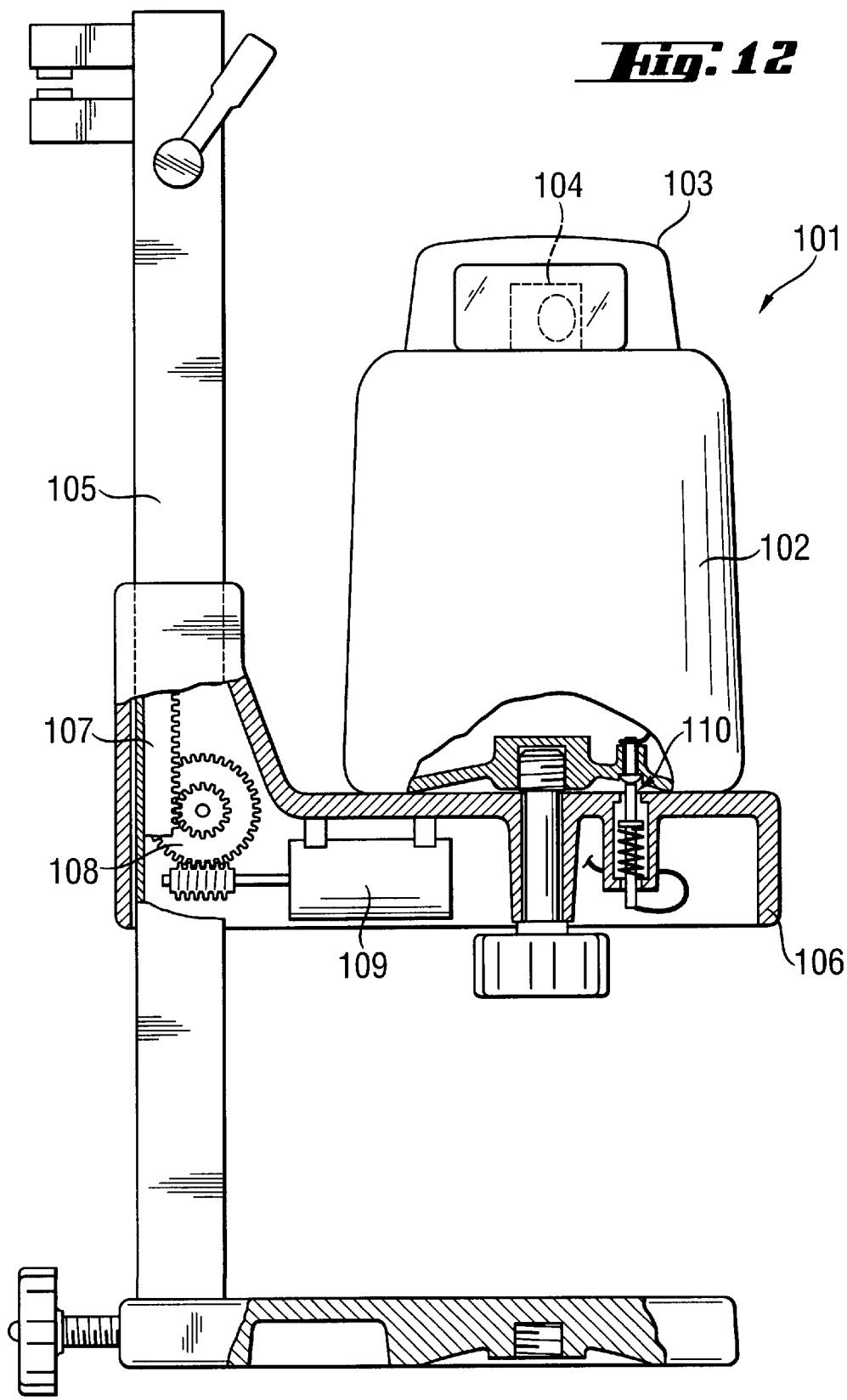
FIG. 12 an elevational view of a fourth embodiment of a rotational constructional laser according to the present inventory.

A rotational constructional laser according to the present invention, which shown in FIG. 12, is generally designated with a reference numeral 101. It differs from the laser, which is shown in FIG. 11, only in the manner of the transmission of the control signals. The laser 101, as in the previously discussed embodiments, has a housing 102 in which all of the essential operational components are located. A pentaprism 104 for deflecting the laser beam is located in a housing unit 103 extending above the laser housing 102. There is provided means for rotating the pentaprism 104 about the optical axis. The laser 101 is mounted on a platform 106 which, when necessary, is axially adjusted by being displaced along, e.g., a rail 105 mountable on a wall. The adjusting device for effecting the axial displacement of the platform 106, includes an automatically actuatable drive motor 109 and adjusting elements 107, 108. A signal-transmitting connection of the laser 101 with the platform 106 is effected with a plug-in connection, which is designated in FIG. 12 by a reference numeral 110. The type of the used plug-in connection is a conventional one and, therefore, a more detailed description thereof is believed to be unnecessary. The important feature of the embodiment of the inventive laser shown in FIG. 12 consists in that an automatic axial adjustment of the penta\prism 104 is effected together with the laser 101 mounted on the platform 106.

The adjusting device is actuated by a signal outputted by an evaluation and control device in response to the detection of an error position of the deflection prism.

Figure 13:
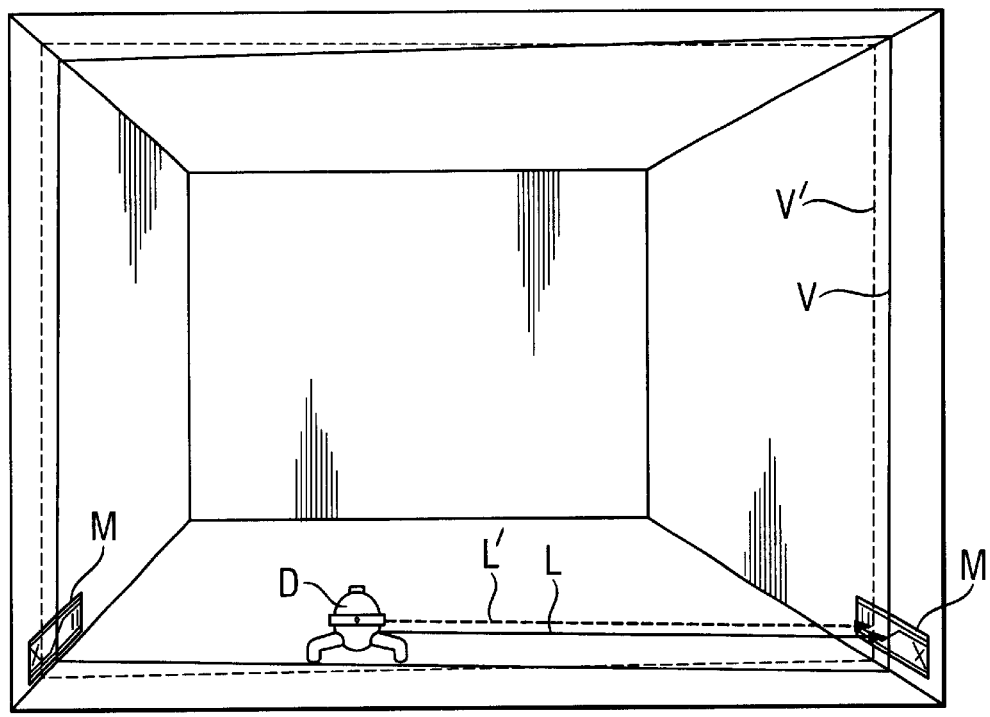

FIG. 13 shows an example of an often use of a rotational constructional laser when it is necessary to display a vertical plane defined by two row of points arranged in different directions with respect to the laser. The two rows of points are given through middle regions of both target marks M. The rotational constructional laser, which is used, is equipped with an adjusting device for adjusting an axial position of the deflection device according to any of the above described embodiments of the present invention. The laser in FIG. 13 is designated with a letter D.

The target marks M are arranged within a predetermined tolerance range, e.g., ±45° to a horizontal, on both sides of the laser D. When the emitted laser beam L' and a vertical plane V', on which the laser beam falls, deviate from a predetermined position, for a correct adjustment, an adjusting device and a tilting device for tilting the optical axis in a plane are necessary. When the deviations of the laser beam L' from a middle position are shown on the target marks M as having the same deviation sign, an axial displacement of the deflection device for the laser beam is effected. As soon as the deviation on one of the target marks M changes its sign, intermittently or simultaneously, the tilting device and the axial position-adjusting device are actuated and are operated until the laser beam L' reaches the middle position on both target marks M, and the set position of the vertical plane V is attained, which is shown in FIG. 13 with solid lines. It should be clear that the recognizing the deviation of a laser beam from the middle position of a target mark, the later should be somewhat modified in comparison with the target mark shown in FIG. 2. This is by providing additional reflecting and phase-shifting regions in the regions of the longitudinal ends of the target mark, as is known.

Figure 14:
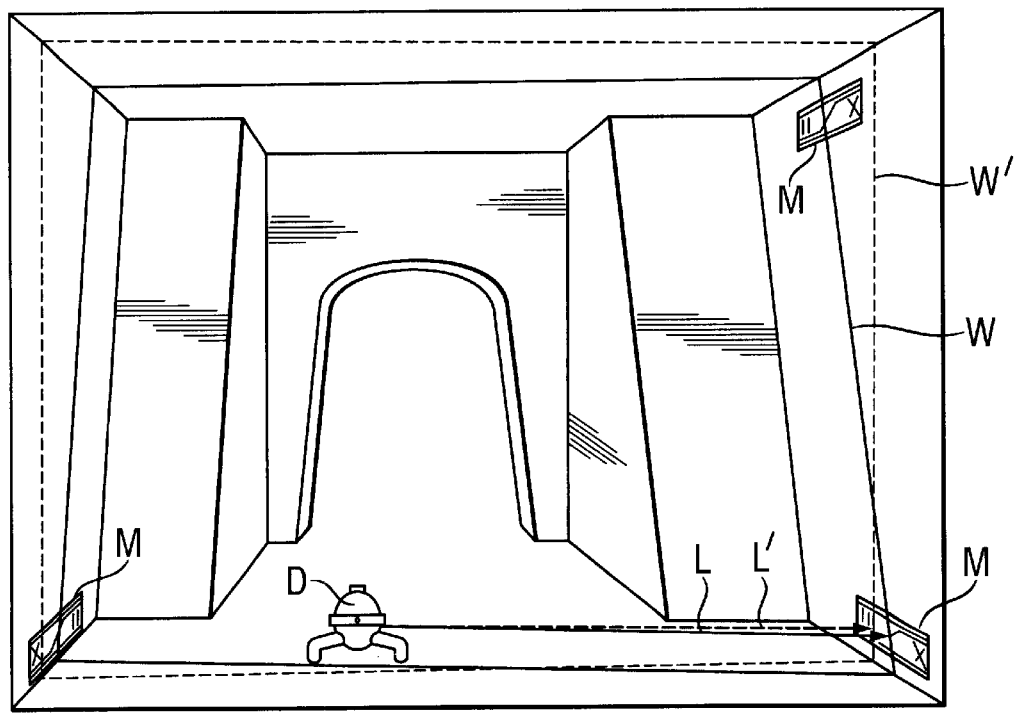
FIG. 14 a schematic view illustrating another example of use of a rotational constructional laser according to the present invention.

FIG. 14 shows an example of the use of the rotational constructional for displaying a general inclined plane which should pass through three predetermined point on a structure. To this end, three target marks M are provided on the structure and spaced from each other by an angle of at least 45°. The laser beam L' and the plane W', on which the laser beam L' falls and which is shown in FIG. 14 with dash lines, are not in a desired position. For obtaining of the correct set position, an axial adjustment of the laser beam deflection device and titling of the optical axis in two mutually perpendicular planes are necessary. To this end, alternating axial adjustment and tilting of the laser beam L' and of the plane W' in one or another direction is effected until the laser beam L is in its middle position on all three target marks M and the inclined surface W occupies its set position, as shown in FIG. 14 with solid lines. The target marks M, like in the example shown in FIG. 13, need be modified to facilitate bringing the plane W in its set position.

When the laser 2, during the axial adjustment and tilting, reaches the limits of its adjustment region, the laser D emits an optic and/or acoustic signal. Also, the laser D is provided with an optical and/or a coustic alarm device which emits a warning signal in the case the detection device, which is located in the laser 2, detects a combination of marks that leads to a redundancy and, therefore, to contradictory results.

Thought the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A rotational constructional laser, comprising a housing (2; 32, 72; 92, 102); a light source (3, 33) for emitting a laser beam (L) and located in the housing; a housing unit (10; 51; 73; 93; 103) at least partially projecting beyond the housing (2; 32; 72; 92; 102) and having a least one beam hole (52, 53) for the laser beam; a laser beam deflection device (7; 50; 74; 104) located in the housing unit (51; 73; 93; 103); drive means for rotating the deflection device; a device (37) for tilting a rotational axis of the deflection device; a detection device for detecting a return laser beam (R) reflected from a display mark and entering the housing unit through the at least one beam hole; an evaluation and control unit connected with the defection device and controlling operation of the tilting device in accordance with detection data obtained in the detection device; and an automatically actuatable device (40; 75; 107; 108; 109) for adjusting an axial position of the deflection device (50; 74; 104) with respect to an initial axial position of the deflection device in accordance with the detection data obtained in the detection device.

2. A laser according to claim 1, wherein the axial position adjusting device comprises a mechanically vertically adjustable stativ (94, 105) and means (97, 98) for vertically displacing the stativ in accordance with control signals generated by the evaluation and control unit.

3. A laser according to claim 2, wherein the stativ has a mounting plate (106) provided with connection contacts (110) connectable, upon mounting of the laser on the mounting plate (106), with corresponding contacts provided on the laser housing (102) for communication the control signals, which are generated by the evaluation and control unit, to the stativ displacing means (97, 98).

4. A laser according to claim 1, wherein the adjusting device (75) comprises a rail (78) on which the housing (72) is supported in such a manner that the rotational axis of the deflection device extends parallel to the rail (78), and means for displacing the housing (72) along the rail (78) in accordance with control signal generated by the evaluation and control unit.

5. A laser according to claim 4, wherein the displacing means comprises drive rollers (76) cooperating with the rail (78) and support rollers (77).

6. A laser according to claim 1, further comprising a platform (46) for supporting the deflection device (50) and axially displaceable by the adjusting means.

7. A laser according to claim 6, wherein the housing unit (51) has a shape of a lantern and is fixedly connected with the housing (32), and wherein the platform (46) for supporting the deflection device (50) is located in the housing (32).

8. A laser according to claim 7, wherein an axial displacement path of the platform (46) amounts to 65 mm from a middle position in each of opposite directions.

9. A laser according to claim 8, wherein the lantern-shaped housing unit (51) has four light beam permeable windows (52) extending in an axial direction and having a height amounting to from about 150 mm to about 160 mm.

10. A laser according to claim 9, wherein the lantern-shaped housing unit (51) has a further beam opening (53) extending substantially transverse to the rotational axis of the deflection device which coincides with a laser optical axis.

11. A laser according to claim 7, wherein the platform (46) is supported at three points, with at least one of the support points being formed by an axially extending threaded spindle (41) which cooperates with an adjusting motor (44).

12. A laser according to claim 11, wherein all three support points are formed by axially extending threaded spindles (41, 42, 43) synchronously displaceable by the adjusting motor.

13. A laser according to claim 1, further comprising a keyboard provided on the housing (32) and connected with the evaluation and control unit.

14. A laser according to claim 1, further comprising a further light source arranged within the housing, and a further deflection device for deflecting a light beam emitted by a further light source and located in a second housing unit likewise projecting beyond the housing and having at least one beam opening inclined by 90° with respect to the at least one beam opening in the first housing unit.

15. A laser according to claim 14, wherein the further deflection device is axially adjustable along a rotational axis thereof in accordance with the control signals generated by the evaluation and control unit.

16. A laser according to claim 1, wherein the deflection device (50; 74; 104) comprises a pentaprism which deflects a least a part of the laser beam by 90°.

17. A laser according to claim 1, wherein the adjusting device comprises end position sensors for emitting at lest one of an optical signal and an caustic signal upon reaching an end position.

\* \* \* \* \*